Inventor:
William McMurray,
by Donald R. Campbell
His Attorney.

Inventor:
William McMurray,
by Ronald R. Campbell
His Attorney.

Inventor:
William McMurray,
by Donald R. Campbell
His Attorney.

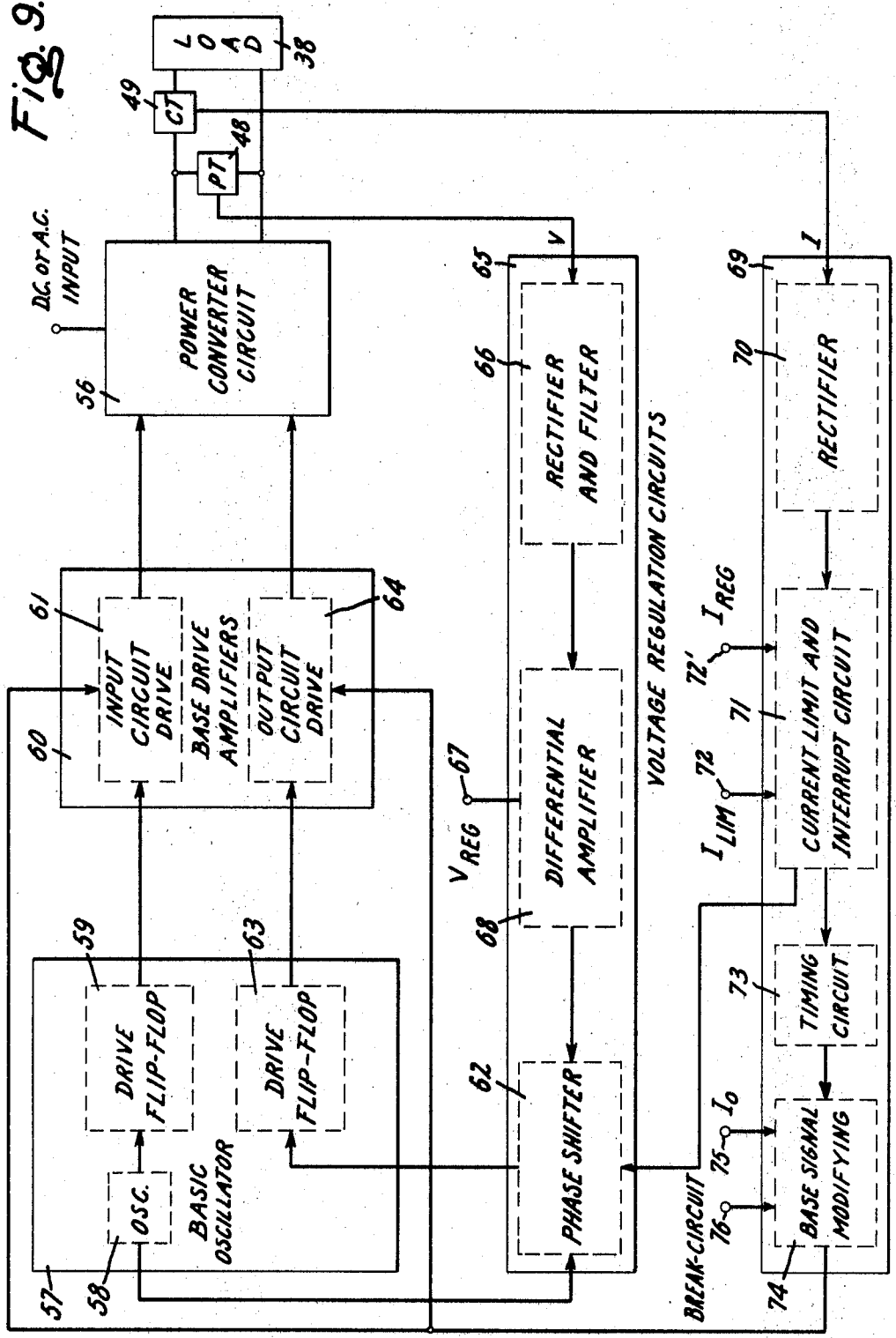

`3,517,300`
POWER CONVERTER CIRCUITS HAVING A HIGH FREQUENCY LINK
William McMurray, Schenectady, N.Y., assignor to General Electric Company, a corporation of New York
Filed Apr. 16, 1968, Ser. No. 721,817
Int. Cl. H02m 5/16, 5/30
U.S. Cl. 321—60                                       14 Claims

ABSTRACT OF THE DISCLOSURE

Several single phase solid state power converter circuits have a high frequency transformer link whose windings are connected respectively to the load and to a D-C or low frequency A-C source through inverter configuration switching circuits employing inverse-parallel pairs of controlled turn-off switches (such as transistors or gate turn-off SCR's) as the switching devices. Filter means are connected across the input and output terminals. By synchronously rendering conductive one switching device in each of the primary and secondary side circuits, and alternately rendering conductive another device in each switching circuit, the input potential is converted to a high frequency wave, transformed, and reconstructed at the output terminals. Wide range output voltage control is obtained by phase shifting the turn-on of the switching devices on one side with respect to those on the other side by 0° to 180°, and is used to effect current limiting, current interruption, current regulation, and voltage regulation.

---

A concurrently filed application by Jerry L. Stratton and assigned to the same assignee as the present invention, Ser. No. 721,643, discloses and claims the broad concept of this type of power converter circuit having an A-C input and output. Another concurrently filed application by the present inventor and assigned to the same assignee, Ser. No. 721,664, discloses and claims similar power converter circuits which employ series capacitor commutated solid state thyristor switching devices.

This invention relates to power converter circuits, and more particularly to a family of power converter circuits employing solid state controlled turn-off switches such as transistors as the current switching devices. These converter circuits have a high frequency transformer coupling link and are operable to function as an electronic transformer for a D-C supply or a low frequency A-C supply, and as a wide range voltage control.

The power converter circuits herein descirbed are derived from a circuit which comprises basically a plurality of solid state switches connected to the windings at each side of a high frequency transformer. The solid state switches are rendered alternately conductive in inverter fashion to convert the low frequency A-C or D-C supply voltage waveform to a high frequency wave, and the solid state switches on the secondary side are operated in synchronism to reconstruct the original supply waveform at the desired output voltage level for application to a load. Because of the high frequency link, only a comparatively small transformer need be used to provide the voltage transformation and isolation functions. It is convenient to implement this basic power converter circuit, which can be called an electronic transformer, with controlled turn-off switches such as the transistor or gate turn-off thyristor which can be easily turned off or rendered nonconductive without regard to the power circuit voltage and current by a control electrode signal. This permits the solid state switches on the primary side and secondary side to be operated in exact synchronism so that there is always a closed path from the supply to the load.

To be economically and technically attractive, this converter circuit should desirably include other functions such as current limiting, current interruption, voltage regulation, and current regulation. These functions are now provided by separate pieces of equipment as for example circuit breakers, current limiters, and tap changers, but the presence of the solid state switches in the circuit suggests the possibility of controlling them to provide the additional functions. Current limiting is needed, in fact, to protect the solid state switches. It is seen that current interruption can be obtained simply by opening all the switches, but the manner of obtaining the functions of current regulation, current limiting, and voltage regulation is not so readily apparent. Other desirable features of the new converter circuits are brought out in the objects of the invention which follow.

Accordingly, an object of the invention is to provide a new and improved power converter circuit for resistive and reactive loads having a high frequency link which uses as the current switching devices controlled turn-off solid state switching devices of the type that are rendered nonconductive by a control electrode signal.

Another object is to provide a new and improved power converter circuit having a high frequency transformer link which operates from either a DC supply or a low frequency supply and includes a plurality of solid state switches which can be controlled such that the converter circuit functions as an electronic transformer with current limiting, current interruption, current regulation, and voltage regulation functions.

Yet another object is the provision of a new and improved power converter circuit employing a high frequency transformer wherein the input and output switching circuits allow complete reversibility of power flow, are relatively simple and employ a small number of solid state devices and energy storage components, and wherein the control circuits on each side of the transformer are similar.

A further object is to provide a new and improved power converter circuit of the foregoing type which because of the degree of voltage regulation obtained can be used as a smooth wide range voltage control.

In accordance with the invention, the new power converter circuit comprises a high frequency linear transformer having a pair of inductively coupled windings. A first inverter switching circuit includes at least a pair of alternately conductive solid state switching means each of which is effectively connected in series circuit relationship with at least a portion of one of these windings across a first pair of terminals in which appears an electric potential. A second inverter configuration switching circuit includes at least a pair of alternately conductive solid state switching means each of which is effectively connected in series circuit relationship with at least a portion of the other transformer winding across a second pair of terminals. The solid state switching means comprises a controlled turn-off device of the type which is rendered nonconductive by a control electrode signal, such as a transistor or gate turn-off thyristor device. Control means are provided for rendering conductive at least one of the switching means in each of the switching circuits, and for alternately rendering conductive at least one of the other switching means in each of the switching circuits at a high frequency switching rate which is relatively high compared to the frequency of the electric potential appearing in the first pair of terminals. There is additionally phase shift means coupled to the control means for rendering conductive the switching means in the first and second switching circuits at a selected phase angle, one with respect to the other, whereby the electric potential appearing in the first pair of terminals is converted to a high frequency wave and reconstructed with the desired voltage control at the second pair of terminals.

The foregoing and other objects, features and advantages of the invention will be apparent from the following more particular description of several preferred embodiments of the invention, as illustrated in the accompanying drawings wherein.

Figure 3:
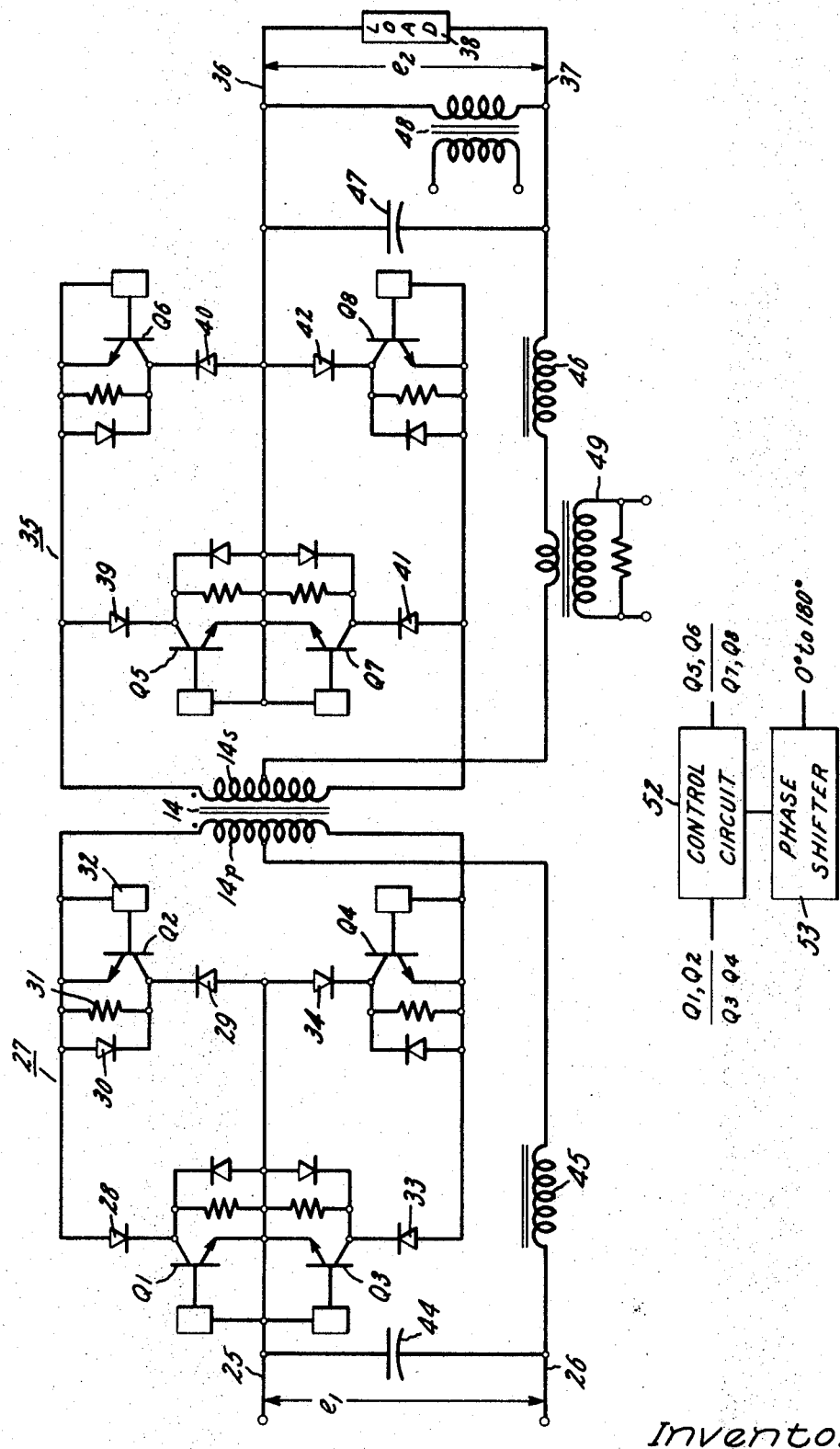
FIG. 3 is a detailed circuit diagram of a preferred embodiment of the new power converter circuit implemented in the center-tapped transformer circuit configuration with transistors as the solid state switching devices.
Figure 4A:
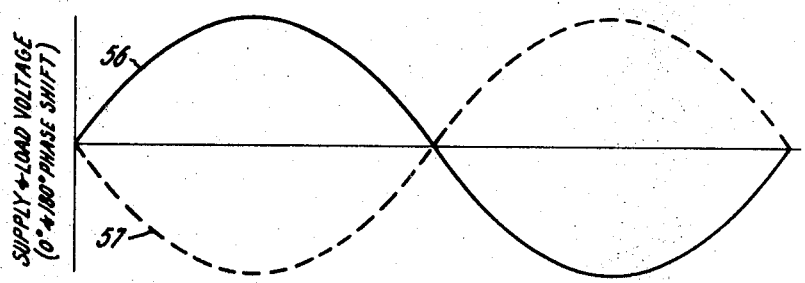
Figure 4B:
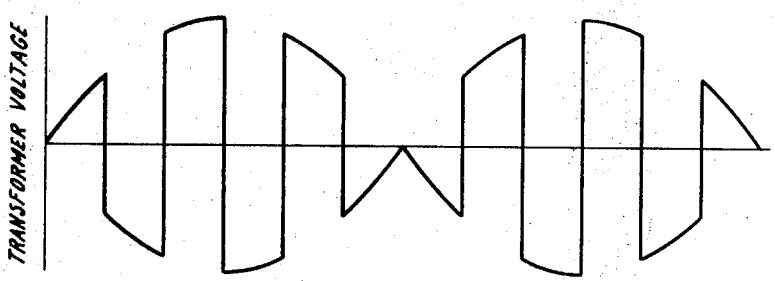
Figure 4C:
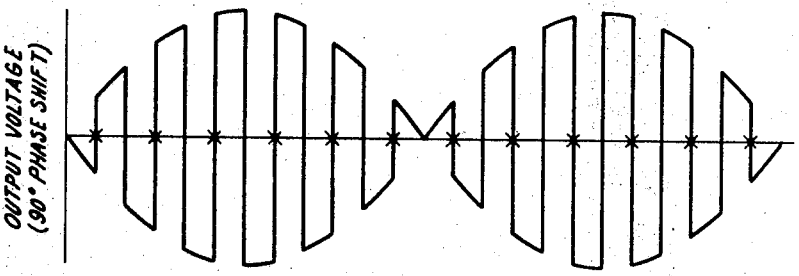
Figure 4D:
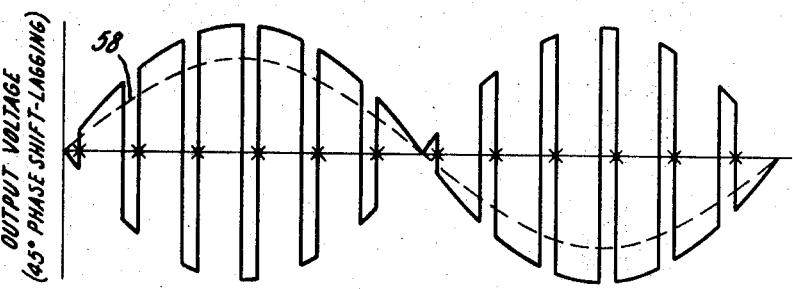
Figure 4E:
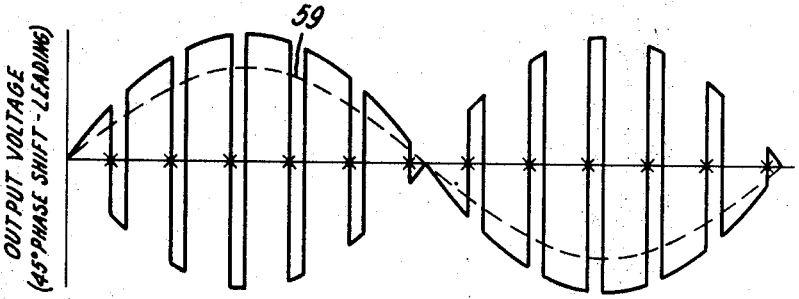
Figure 5:
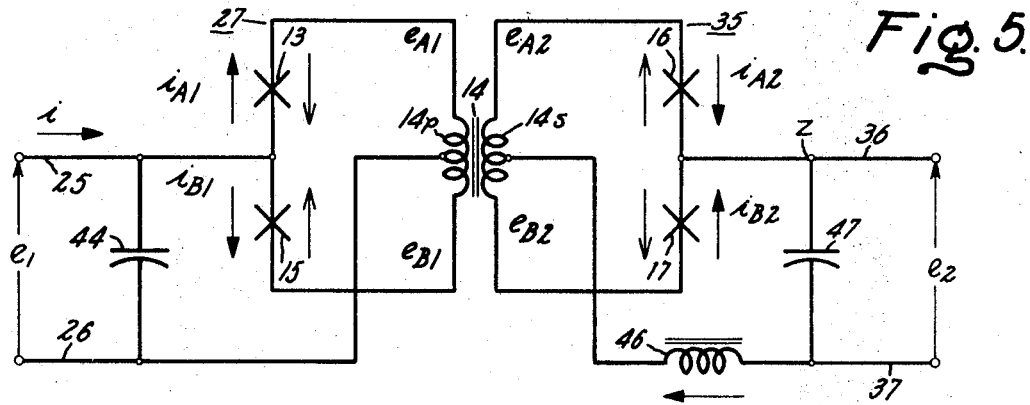
Figures 6A, 6B:
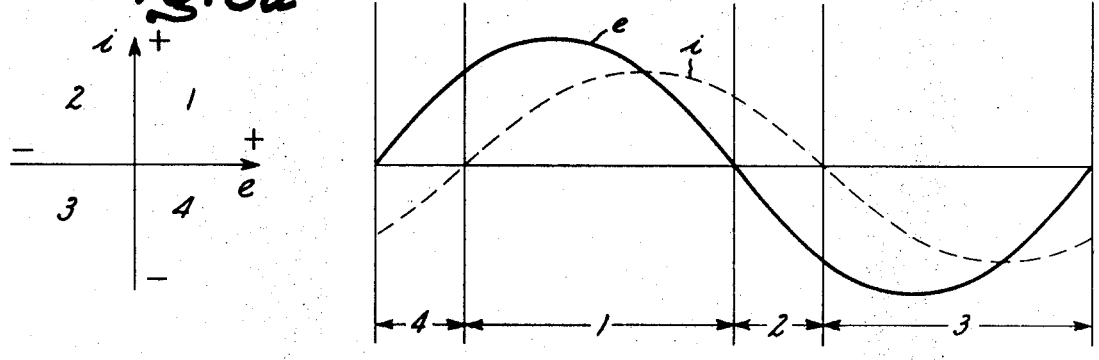
Figure 10:
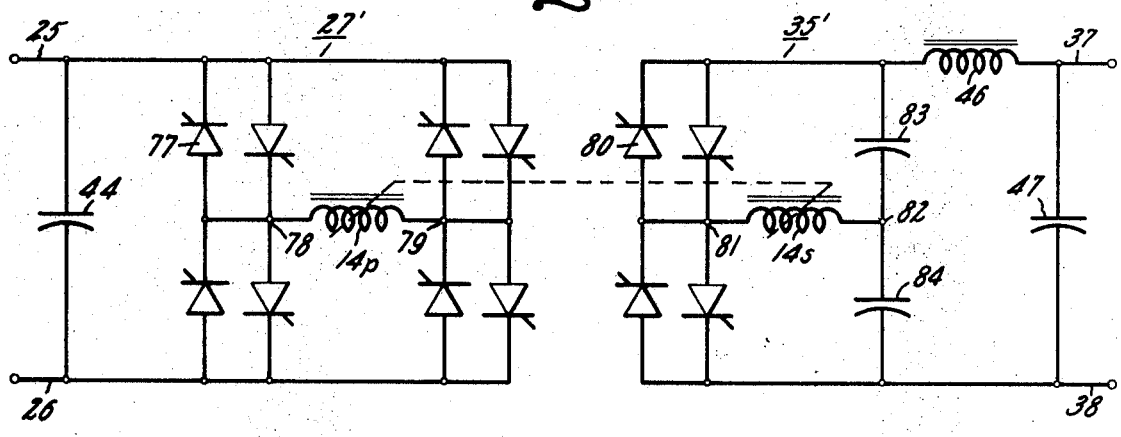
Figure 7A:
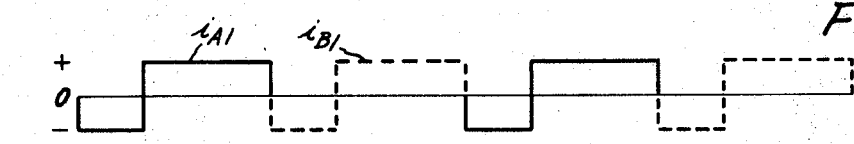
Figure 7B:
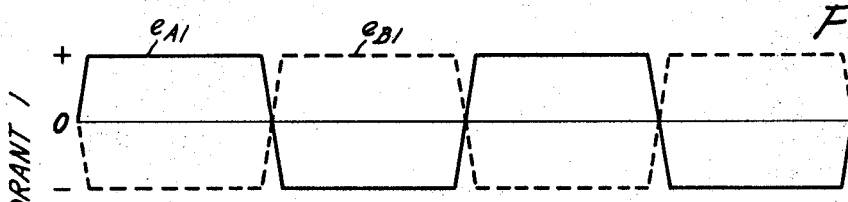
Figure 7C:
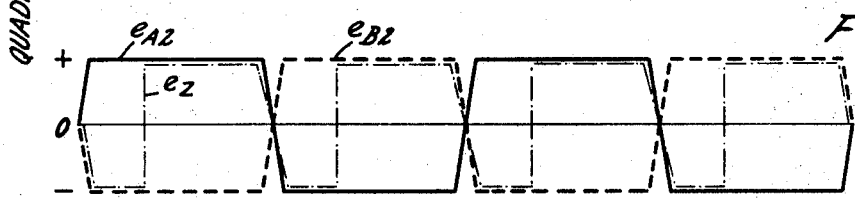
Figure 7D:
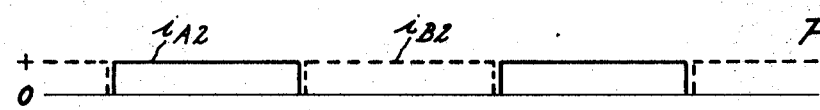
Figure 8A:
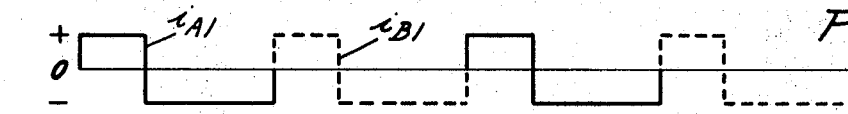
Figure 8B:
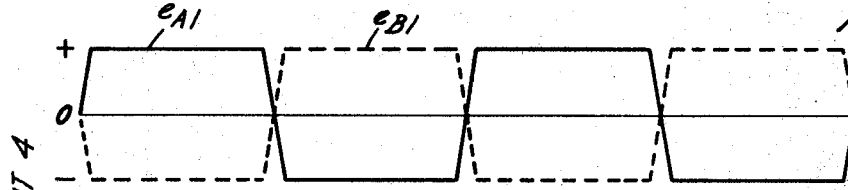
Figure 8C:
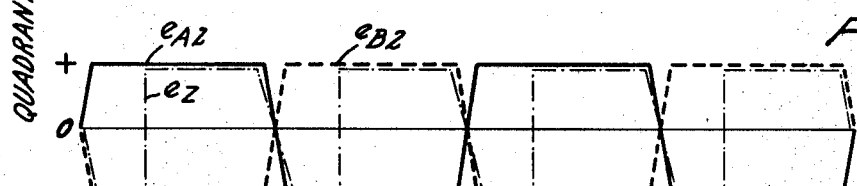
Figure 8D:
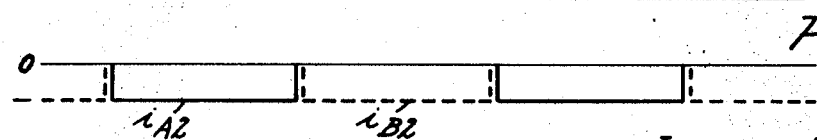

FIGS. 4a to 4e are waveform diagrams for the circuit of FIG. 3; FIG. 4a shows the input voltage for an A-C supply and the output voltages when the transistors on the primary and secondary sides are switched in phase and 180° out of phase; FIG. 4b shows the transformer voltage for an assumed frequency ratio of six; FIGS. 4c to 4e show respectively the secondary side voltage before filtering when the switching of the transistors on the secondary side lags the switching of those on the primary side by 90°, by 45°, and leads by 45°, the output voltage in the last two figures after filtering being shown in dashed lines;

FIG. 5 is a simplified schematic diagram of the FIG. 3 circuit but including symbols useful in the discussion of the succeeding figures;

FIGS. 6a and 6b are sketches illustrating the four quadrants of operation of a transformer and the identification of these quadrants on voltage and current waveforms for a lagging power factor load;

FIGS. 7a to 7d are waveforms for quadrant 1 operation of the FIG. 3 circuit in which the switching of the secondary side lags the primary side; FIG. 7a shows the primary side current and FIG. 7b the transformer voltage on the primary side; FIG. 7c shows the secondary side transformer voltage on which is superimposed the voltage at output point Z before filtering; and FIG. 7d shows the current on the secondary side;

FIGS. 8a to 8d are similar to FIGS. 7a to 7d and are waveforms for quadrant 4 operation of the FIG. 3 circuit;

FIG. 9 is a block diagram of a control system for the circuit of FIG. 3 including provision for obtaining the functions of voltage regulation, current regulation, current limiting, and current interruption by phase shifting the turn-on of the transistor switches; and FIG. 10 is a detailed circuit diagram of a power converter circuit employing GTO-SCR's as the power switches, in which the input and output inverter configuration circuits are respectively in the full bridge and half bridge configurations.

Figure 1A:
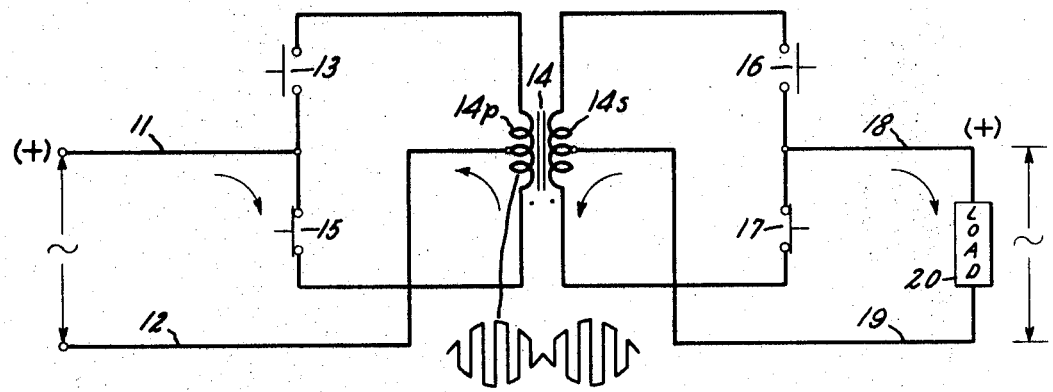
FIGS. 1a and 1b are schematic circuit diagrams of a simplified power converter circuit to illustrate the principles of the invention, showing respectively the condition of the circuit during each high frequency half cycle.
Figure 1B:
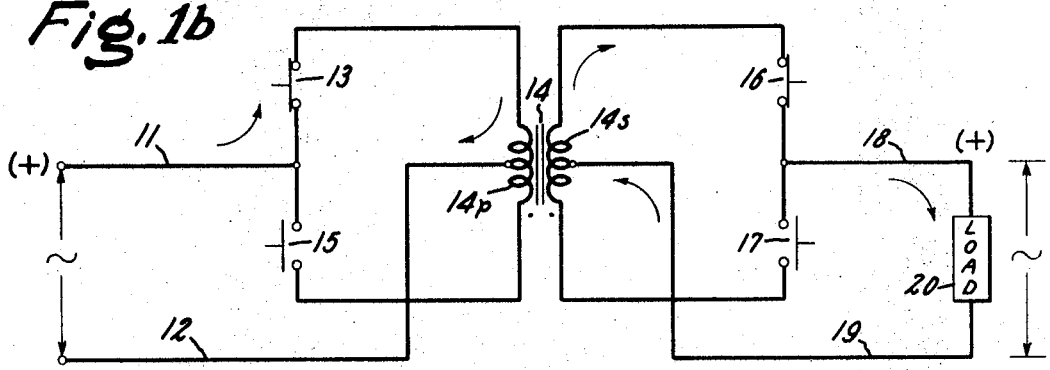
Figure 2:
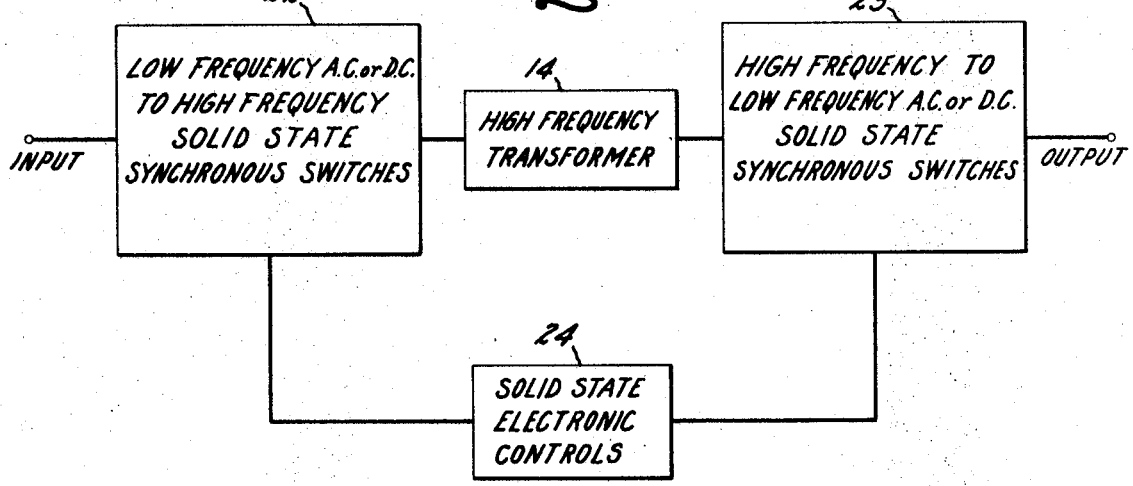
FIG. 2 is a block diagram of the circuit of FIG. 1.

Before discussing the preferred embodiment of the new power converter circuit shown in FIG. 3, the principles of operation of this new converter circuit will be explained first with regard to the simplified diagrams of FIGS. 1a and 1b and the block diagram of FIG. 2. In FIG. 1a, a low frequency alternating current source such as a commercially available 60 Hz. source is applied to the input terminals 11 and 12 of the converter circuit. The terminal 11 is connected through a first solid state switch 13, here shown as a simple switch, to one end of the primary winding 14p of a high frequency linear coupling transformer 14, and is also connected through a second solid state switch 15 to the other end of the primary winding 14p. The high frequency transformer 14 is a center-tapped transformer, and the center tap of the primary winding 14p is coupled to the other input terminal 12. On the secondary side of the transformer, the two ends of the secondary winding 14s are connected in similar fashion through the respective solid state switches 16 and 17 to one output terminal 18, while the other output terminal 19 is coupled to the center tap of the secondary winding. A load 20 is connected across the output terminals 18 and 19.

The four solid state switches 13, 15, 16, and 17 are operated in pairs in synchronism to convert the low frequency waveform into a high frequency wave which is given the desired voltage transformation in the transformer 14 and is reconstructed on the other side of the transformer for application to the load 20. FIGS. 1a and 1b show the condition of the switches for the two half cycles of the high frequency wave, assuming that the input alternating current waveform is poled such that the terminal 11 is positive with respect to the terminal 12 and that for purposes of simplification the transformer 14 has a unity turns ratio. During the first half cycle of the high frequency wave, switches 15 and 17 are closed synchronously, while the other two switches 13 and 16 are opened in synchronism at the same time. With switches 15 and 17 closed, the dot ends of the primary and secondary windings of the high frequency coupling transformer 14 are positive and the direction of the current through the primary side and the secondary side of the transformer are as indicated by the arrows. It will be noted that the output terminal 18 is positive with respect to the terminal 19. During the other half cycle of the high frequency wave as shown in FIG. 1b, the switches 13 and 16 are closed, while the switches 15 and 17 are now open. Since the frequency of the high frequency wave is considerably higher than that of the low frequency source, the input terminal 11 is still positive. The polarity of the voltages in the transformer 14 are reversed, however, and the no-dot ends are now positive so that the current flow through the transformer is in the other direction. On the secondary side, the output terminal 18 is still positive with respect to the terminal 19 and the direction of current through the load 20 is in the same direction. Thus, the voltage magnitude and polarity applied to the load remains the same as that of the input, which in this particular instance is some slowly varying positive value. As is shown in the small waveform diagram in FIG. 1a, the polarity of the transformer voltages changes at the high frequency switching rate, which is shown here for purposes of illustration as being 480 Hz. for a 60 Hz. input. On the other half cycle of the low frequency A-C input, the input terminal 11 will now be negative with respect to the terminal 12. Alternately closing the switches 15 and 17 synchronously and then switches 13 and 16 synchronously at the high frequency rate in like manner switches the high frequency voltage on the secondary side of the transformer so that the terminal 18 is always negative with respect to the terminal 19 and the flow of current through the load 20 during the negative half cycle is always in the other direction. It will be noted that in this diagrammatic version of the power converter circuit in the center-tapped transformer circuit configuration, there is always a closed path for current to flow from one side to the other, including the transformer coupling path, so that ideally no energy storage components are required.

The circuit when operated in this manner behaves as an electronic transformer, it being understood that the term used in this manner refers to the combination of the high frequency transformer link with the input and output switching circuits. In addition to the voltage transformation and isolation functions provided by the high frequency transformer 14, the four switches 13, 15, 16, and 17 can be operated to obtain voltage regulation and current limit functions. When the switches 13 and 17 are closed simultaneously while the switches 15 and 16 are kept open, the polarity of the voltage across the load 20 is reversed for one-half of a high frequency cycle. This action when done in the proper manner can reduce the effective output voltage. It can serve to very quickly reduce reactive fault current in the load by reversing the voltage during peak overcurrents instead of just dropping it to zero. Assuming that the high frequency rate is very high, in the order of several kHz. or more, this action occurs in tenths of milliseconds and therefore can start to control the low frequency A-C input current very rapidly. Current interruption can also be obtained by appropriately operating these switches. If too high a current flows in the load, the switches 13 and 15 can be opened while the switches 16 and 17 are kept operating to permit reactive current to die out, and then are opened at the first input frequency current zero for complete isolation. That is to say, the circuit acts as a static circuit breaker if switches 13 and 15 or switches 16 and 17 are kept opened.

It is assumed in the above discussion that the four switches 13, 15, 16, and 17 are solid state devices which can be controlled to be alternately conductive for desired intervals of time in inverter fashion. In the block diagram of this new power converter circuit shown in FIG. 2, the high frequency transformer link 14 will be noted between the input circuit 22 on the primary side of the transformer and the output circuit 23 at the secondary side of the transformer, which as indicated both contain solid state synchronous switches. Appropriate solid state electronic controls 24 are provided to operate the switches in the primary side circuit 22 and the secondary side circuit 23. The input and output voltages in addition to having a low frequency A-C value may also have a D-C value, in view of the fact that because of the high frequency switching rate of the solid state switches, the input voltage appears as a slowly varying or substantially unvarying direct current. When the solid state switches are transistors or gate turn-off thyristors, the high frequency link may operate for example at a rate of 10 kHz. while the input and output voltages have a frequency which is relatively low as compared to this, for example, in the range of 0–400 Hz. A voltage having a frequency of 0 Hz. is, of course a D-C voltage.

FIG. 3 shows the power converter circuit in the same center-tapped transformer circuit configuration employing transistors as the solid state switching devices. When operated in the switching mode, a transistor is a controlled turn-off switch since when base current is supplied it has a low impedance in the emitter-to-collector path for conducting current, and has a high impedance when base drive current is removed so that the emitter-to-collector path will conduct substantially no current. Transistors turn on and off in response to a base control signal applied to the base electrode or control electrode, and need no reverse current between the main electrodes for turn-off as do ordinary thyristors. Either PNP or NPN transistors may be used, and the transistor which is selected should have as high a power rating as possible and should be capable of switching at high frequency rates in the order of 5 kHz. to 10 kHz.

In FIG. 3 a pair of input supply terminals 25 and 26 are adapted to be connected across a source of D-C or low frequency A-C potential which produces a supply voltage $e_1$. The input switching circuit or frequency step-up circuit 27 comprises four transistors Q1 to Q4, which are preferably silicon NPN transistors, arranged as two pairs of inverse-parallel connected transistors to conduct current of either polarity and to simulate the bidirectional conducting properties of the switches 13 and 15 in FIG. 1. A blocking diode is connected in series with each power transistor, since the base-emitter junction of a typical transistor cannot withstand high reverse voltage. Thus, the collector-to-emitter conducting path of the transistor Q1 is connected in series with a blocking diode 28 between the supply terminal 25 and the dot end of the primary winding 14p of the high frequency coupling transformer 14. The series circuit comprising the collector-to-emitter conducting path of the transistor Q2 and another blocking diode 29 is connected across the series connected transistor Q1 and diode 28, between supply terminal 25 and the dot end of the primary winding 14p. Transistor Q1 and diode 28 have the opposite polarity as compared to transistor Q2 and diode 29, such that transistor Q2 and diode 29 conduct when the current flows from supply terminal 25 to the terminal 26, and transistor Q1 and diode 28 conduct when the current flows from the terminal 26 to terminal 25. There is connected across the load terminals of each power transistor a reverse voltage diode 30 and a protective resistor 31. In addition, a snubbing circuit not here illustrated to reduce the rate of rise of voltage may also be connected across the load terminals of each power transistor. A source of base control signals for supplying current to the base of the transistor Q2 to render it conductive is represented by a box 32 connected between the base and emitter electrodes of the transistor. The other power transistors have similar control signal sources similarly represented by a box connected across the base-emitter electrodes but which are unnumbered.

The input switching circuit 27 is completed by the series circuit comprising the transistor Q3 and a blocking diode 33 across which is connected the inverse parallel series circuit comprising the transistor Q4 and another blocking diode 34, and this bidirectional conducting pair of circuits is in turn connected between the supply terminal 25 and the no-dot ending of the primary winding 14p of the coupling transformer. Diode 34 and transistor Q4 conduct when the supply current flows from terminal 25 to terminal 26, which is coupled to the mid-tap point of primary winding 14p, and transistor Q3 and diode 33 conduct when the supply current flows from terminal 26 to terminal 25. The output switching circuit or frequency step-down circuit 35 comprising the transistors Q5 to Q8 is connected across the output terminals 36 and 37 for producing an output voltage $e_2$ to be applied to a load 38. The load 38 may be a resistive, capacitive, inductive, or counter-EMF load, and as will be explained in greater detail later, the converter circuit is operated in exactly the same manner for a load of any power factor. The series circuit comprising the transistor Q5 and a blocking diode 39 is connected in inverse parallel relationship with the series circuit comprising the transistor Q6 and another blocking diode 40, and this bidirectional conducting circuit is connected between the dot ending of the secondary winding 14s and the output terminal 36. The other bidirectional conducting circuit comprising the inverse-parallel connected transistor Q7 and blocking diode 41, and transistor Q8 and blocking diode 42, is connected between the no-dot end of the secondary winding 14s and the output terminal 36. The other output terminal 37 is coupled to the center tap of the high frequency coupling transformer secondary winding. Although for convenience the transformer 14 is shown with a unity turns ratio, it will be understood that the turns ratio may be selected to obtain any desired voltage transformation.

As will be explained in detail later, the converter circuit can be operated in a mode in which selected pairs of transistors in primary side circuit 27 and secondary side circuit 35 are switched synchronously and in another mode in which the pairs of transistors on the primary and secondary sides are switched at a selected phase angle one with respect to the other. At 0° phase shift, of course, the transistors are being switched synchronously. For the second mode of operation it is generally necessary that there be energy storage components. To this end, an input filter capacitor 44 is connected in shunt across the input terminals 25 and 26, and a small inductor 45 may if desired be connected in series with one of the terminals, and is shown here connected between the terminal 26 and the center-tap point on primary transformer winding 14p. Filter capacitor 44 serves to smooth any variation in the source of supply and provide a "stiff" source, i.e., a source which has low impedance at the high frequency switching rate of the input circuit 27, which like the output circuit 36 has an inverter circuit configuration. On the output side, the filter connected between output terminals 36 and 37 is primarily inductive and includes a relatively large filter inductor 46 in series with one of the terminals such as the terminal 37, and a shunt connected capacitor 47. The output filter is designed to reduce components of current at even harmonics of the switching frequency, particularly the second harmonic, which are applied to the load. It will be appreciated that if the load, for instance a motor, has sufficient inductance, then the output filter inductor 46 and capacitor 47 may be omitted. To sense the output voltage for voltage control purposes, a potential transformer 48 is connected across terminals 36 and 37. To sense the output current for current regulation, current limiting and current interuption purposes, the converter circuit is completed by a current transformer 49 connected in series with output terminal 37.

In the normal mode of operation (0° phase shift) of the power converter circuit shown in FIG. 3, power transistors Q1 and Q2 in the input switching circuit 27 on the primary side of the high frequency transformer 14 are turned on at the same time that transistors Q3 and Q4 are turned off, and transistors Q5 and Q6 in the output switching circuit 35 on the secondary side of the coupling transformer are turned on synchronously with the transistors Q1 and Q2, while at the same time the transistors Q7 and Q8 are turned off. For the first half of the high frequency cycle, assuming that the input potential $e_1$ is a low frequency A-C potential having a polarity such that input terminal 25 is positive, conduction of current on the primary side of the circuit is through the diode 29 and the transistor Q2, and the dot end of the transformer has a positive polarity. On the secondary side of the circuit, current flow is out of the dot end of the secondary winding through the forward biased diode 39 and power transistor Q5. Thus, the output terminal 36 is positive with respect to the terminal 37. On the second half of the high frequency cycle, transistors Q3 and Q4 in the input circuit 27 and transistors Q7 and Q8 in the output circuit 35 are rendered conductive synchronously, and at the same time transistors Q1 and Q2, Q5 and Q6 are turned off. Since the high frequency switching rate of the power transistors is relatively high as compared to the frequency of the A-C source, the input terminal 25 is still positive and conduction of current takes place through diode 34 and transistor Q4 so that the no-dot end of the primary transformer winding 14p is now positive. In the output switching circuit 35, diode 41 and transistor Q7 conduct current and the output terminal 36 is still positive. For the other low frequency half cycle when the polarity of the low frequency A-C source is such that the input terminal 25 is negative with respect with the terminal 26, the mates of the transistors just discussed, i.e., the other transistor in each of the inverse-parallel connected bidirectional conducting pairs, are rendered conductive in each high frequency half cycle so that the output terminal 36 is negative with respect to the terminal 37.

It is seen that in the 0° phase shift mode of operation of the FIG. 3 power converter circuit in which the transistors in the primary side circuit 27 are switched synchronously with the transistors in the secondary side circuit 35, the converter circuit operates in exactly the same manner as the simplified circuit of FIG. 1 in that the input D-C or low frequency A-C source potential is converted to a high frequency wave and receives the desired voltage transformation in coupling transformer 14 before being reconstructed by the secondary side circuit 35 at the output terminals for application to the load 38. The control circuit for switching the primary side and secondary side power transistors are the same so that the coupling transformer behaves symmetrically. Furthermore, the converter circuit allows complete reversibility of power flow. Thus, when the load 38 is a power generating load, power can be returned through the converter circuit to the supply. Moreover, the normal mode of operation employing the normal control sequence can be maintained when the load 38 is an inductive or capacitive load during the period in each low frequency cycle when reactive current is being fed from the load to the supply through the power converter circuit. As has been mentioned, it is desirable that the high frequency switching rate of the input and output switching circuits 27 and 35 be as high as possible, in the order of 5 kHz. to 10 kHz. or higher, in order that the high frequency coupling transformer 14 be relatively small. The transformer is preferably a toroid of high frequency ferrite material, with bifilar windings to keep the leakage inductance to a minimum. A high frequency transformer further has low interwinding capacitance.

Output voltage control is obtained by phase shifting the turn-on of the transistors on the primary and secondary sides of the converter circuits one with respect to the other. That is to say, the pair of inverse-parallel connected transistors Q1 and Q2 in alternation with the complementary pair of inverse-parallel transistors Q3 and Q4 are being switched at the high frequency rate, and at the same time transistor pair Q5 and Q6 in alteration with the complementary pair Q7 and Q8 are also being switched at the high frequency rate. By phase shifting the turn-on of the transistors on the secondary side, either in a leading or a lagging sense, with respect to the turn-on of the transistors on the primary side of the circuit, within the range of 0° to 180°, the output voltage $e_2$ at the output terminals 36 and 37 can be controlled proportionally from the full value of the instantaneous supply voltage through 0 to the full value of the instantaneous supply voltage with the reverse polarity. It has already been described that when the transistors Q1 and Q2, and Q5 and Q6 are turned on synchronously or with 0° high frequency cycle phase shift, the low frequency supply voltage is reconstructed at the output terminals 36 and 37 with the same polarity. When the turn-on of the transistor pair Q5 and Q6 is phase shifted 180° of the high frequency cycle with respect to the turn-on of the transistor pair Q1 and Q2, this means that transistor pair Q7 and Q8 is turned on at the same time as transistor pair Q1 and Q2 and the supply voltage is reconstructed at the output terminals with the opposite polarity. For instance, if supply terminal 25 is positive and transistor Q2 conducts current so that the dot end of the secondary winding 14p is positive, it follows that on the output side transistor Q8 and diode 42 conduct current so that the output terminal 36 is negative and the terminal 37 is positive. It thus becomes apparent that by phase shifting the switching time of the output side devices 180° from the input side devices, the low frequency supply polarity can be reversed. When the phase shift is 90°, the net load voltage is zero except for the second harmonic of the high frequency switching rate or chopping frequency. This undesired harmonic can be suppressed by properly selecting the component values of the output filter means comprising the filter inductor 46 and the filter capacitor 47. For any phase shift between 0° and 90°, the load voltage magnitude is changed proportionately. As will be shown later, output voltage control obtained in this manner can be used for voltage regulation purposes in an electronic transformer, or can have more general usage in which a power converter circuit operates essentially as a wide range voltage control.

The power converter circuit can be operated with no-load, resistive load, inductive load, and capacitive load, and in all cases output voltage control by phase shifting is obtainable. The control circuit 52 for deriving base drive current signals for the power transistors is shown here schematically, and the transistors on the input and output side of the converter circuit which are rendered conductive together in each high frequency half cycle are separated by horizontal lines. While it is preferable to turn on each of the transistors in a bidirectional conducting pair, such as transistors Q1 and Q2 or Q5 and Q6, and let the circuit conditions determine which of the transistors in each pair actually conducts current, it will be realized that it is also possible to render conductive only those transistors which actually conduct current as determined by appropriate logic circuitry. A phase shift circuit 53 is coupled to the control circuit 52 to determine the relative phase angle at which the transistors on the output side are switched into conduction with respect to those on the input side within the range of 0° to 180° leading or lagging as determined by an input signal to the phase shift circuit.

The operation of the converter circuit when the input side and output side transistors are switched out of phase in order to control the output voltage is better understood with reference to the waveform diagrams shown in FIGS. 4a to 4e. In FIG. 4a, the solid line curve 56 represents the low frequency A-C supply voltage and also represents the output voltage $e_2$ or load voltage when the transistor circuits in the input circuit 27 and the output circuit 35 are switched synchronously or with 0° phase shift. When the input side and output side transistors are switched 180° out of phase, the load voltage is reversed in polarity and is represented by the dashed line 57. The transformer voltage at the high frequency coupling transformer 14 is shown in FIG. 4b for an assumed frequency ratio of 6. For example, if the supply voltage has a frequency of 60 Hz., then the chopping frequency or high frequency switching rate is 360 Hz., although in practice it will be appreciated that the chopping frequency is considerably higher. FIG. 4c shows the voltage in the output circuit 35 before filtering when the switching of the output side transistors lags the switching of the input side transistors by 90°. In this case the fundamental low frequency component of the output voltage after filtering is zero since the positive component areas of the output voltage as shown in this figure are exactly equal to the negative component areas. In this curve, it will be noted that the alternately occurring vertical traces which represent the transition from an instantaneous negative voltage to a positive voltage, or vice versa, are either unmarked or marked by small $x$'s. The transitions which are unmarked coincide with the transitions of the transformer voltage as shown in FIG. 4b and occur because the input side transistors are switched. The alternate transitions marked by $x$'s occur exactly midway between each half cycle of the transformer voltage and occur because the switching of the output side transistors lags the switching of the input side transistors by 90°. In order to suppress the second harmonic of the high switching frequency, the output filter 46, 47 is designed to have relatively high series impedance at twice the chopping frequency, but at the low supply frequency the output filter has high shunt impedance and low series impedance, as is desired.

FIG. 4d shows the output voltage before filtering when the switching of the output side transistors lags the input side by about 45°. As compared to FIG. 4c, the vertical traces marked by the $x$'s which result when the output side transistors are switched are advanced about 45° so that they now are separated from the unmarked vertical traces by only 45° instead of 90°. The dashed line curve 58 represents the output voltage after filtering. On the positive half cycle of the supply voltage, the instantaneous output voltage is positive for a much greater time than it is negative so that the net voltage after filtering is positive. During the negative half cycle of the supply voltage, on the other hand, the reverse situation occurs and the net output voltage is negative. FIG. 4e shows the output voltage before filtering when the switching of the output side transistors leads the input side transistors by 45°. For this situation, the vertical traces marked by $x$'s which occur when the transistors on the output side are switched lead the unmarked vertical traces by about 45°. Dashed line 59 representing the output voltage after filtering is identical to the curve 58 shown in FIG. 4b. This is to be expected because the instantaneous voltage which is obtained is the mirror image of the instantaneous voltage obtained in FIG. 4d, and the net output voltage obtained after filtering will therefore be identical.

In order to further analyze the operation of the FIG. 3 power converter circuit with resistive and reactive loads when output voltage control is obtained by the phase shifting method which has been described, it will be useful to use the symbols shown on the simplified circuit diagram shown in FIG. 5. It is observed that FIG. 5 is identical to FIG. 3 with the exception that the inverse-parallel connected pairs of transistors with their respective blocking diodes have been replaced by idealized bidirectional conducting power semiconductor switches indicated by the large X's and identified by the numerals 13, 15, 16 and 17, the same numerals as are used for the switches in FIG. 1. Controlled turn-off power semiconductor switches other than the transistor can be used in this circuit, such as the gate turn-off silicon controlled rectifier which is also known as a gate turn-off device; and an A-C transistor, if one existed, could be an ideal device for this application. It is only necessary that the controlled turn-off solid state switch be a suitable type which is rendered nonconductive by a control electrode signal without regard to the voltage and current in the power circuit, either by removing a base drive current signal, such as is the case with the transistor, or by applying a short pulse to the control electrode, as is the case with the gate turn-off device. Another change as compared to the FIG. 3 circuit is the elimination of the input filter inductor 45 which as was mentioned is not essential inasmuch as the input filter is primarily capacitive in character. On the output side, as was explained, the filter means comprising the inductor 46 and capacitor 47 is primarily inductive and includes a sizable series filter inductance to maintain the prevailing low frequency A-C current during the high frequency chopping cycles.

In FIG. 5, the current through the first bidirectional switch 13 on the input side is indicated by $i_{A1}$ and the potential at the dot end of the primary winding 14p of the coupling transformer 14 is indicated by $e_{A1}$, where the potential at the center tap of the primary winding is assumed to be 0. The arrowheads on the arrows at either side of the switch 13 designate the instantaneous polarities of voltage and current which are defined to be positive, and the solid head arrows indicate currents while the open head arrows indicate voltages. The currents through the other power switches and the potentials at the other ends of the transformer windings are as shown. The letter Z designates a point in the output circuit at the juncture of the switches 16 and 17, and $e_Z$ represents the potential at point Z with respect to the center tap of transformer secondary winding 14s, which is the output voltage before filtering. A true transformer must be able to operate in four quadrants as defined by the sketch in FIG. 6a for any combination of voltage and current polarity. It follows that each individual bidirectional solid state switch in the FIG. 5 circuit must also operate in all four quadrants. The quadrants of operation for a lagging power factor load during a low frequency A-C cycle of the supply voltage are identified on the voltage and current waveforms in FIG. 6b. In quadrants 4 and 2 the instantaneous voltage and current are opposite in polarity, whereas in quadrants 1 and 3 the instantaneous voltage and current are in the same direction. Quadrant 1 and 3 operation therefore also represents the operation of the circuit for a resistive load. Since quadrants 1 and 3 are similar but converse, and the same can be said for quadrants 4 and 2, it will be sufficient to analyze the operation of the new power converter circuit by considering only quadrant 1 and quadrant 4 operation, where the instantaneous input voltage $e_1$ is positive at terminal 25.

The voltage and current waveforms shown in FIG. 7 for quadrant 1 operation therefore are applicable to a resistive load or to a portion of the low frequency A-C cycle for a reactive load. In FIG. 7 and also in FIG. 8, it is assumed that the switching of the transistor switches on the output side lags the switching on the input side. Similar curves can be drawn for the case in which the output side leads the input side. FIG. 7a shows the current waveform for the input switching circuit 27 or primary side circuit. The current $i_{A1}$ is represented by the solid line waveform while the current $i_{B1}$ is represented by the dashed line waveform, and the vertical line transition from one polarity to the other in each high frequency half cycle occurs when the output side switches are switched. FIG. 7b shows the complementary voltage waveforms $e_{A1}$ and $e_{B1}$ for the two ends of the primary winding 14p at the primary side of the converter circuit. FIG. 7c shows the voltage waveform $e_{A2}$ and $e_{B2}$ which represent the secondary side transformer voltage. The voltages $e_{A1}$ and $e_{A2}$ at the dot ends of the transformer have, of course, the same polarity as do the voltage $e_{B1}$ and $e_{B2}$ at the no-dot ends. Since unit turns ratio is assumed for clarity, the magnitudes of the primary and secondary transformer voltages are the same. FIG. 7c also shows the voltage waveform $e_Z$ for the output side of the converter circuit at the point B. The vertical line transition from negative to positive polarity in each high frequency half cycle occurs when the solid state devices on the secondary side of the circuit are switched. If the lagging phase angle at which the secondary side is switched relative to the primary side is 90°, the vertical line transition would be at the mid-point of each high frequency half cycle. FIG. 7d shows the output side currents $i_{A2}$ and $i_{B2}$, which are seen to be positive. It will also be noted in FIG. 7c that in each high frequency half cycle the instantaneous voltage $e_Z$ is positive for a longer time than it is negative so that the net voltage $e_Z$ is positive which means that the circuit is drawing current from the supply rather than feeding current back into it.

FIGS. 8a to 8d are the current and voltage waveforms for quadrant 4 operation of the converter circuit and are similar to the waveforms in FIGS. 7a to 7d for quadrant 1 operation. It will be observed in FIG. 7d that the currents $i_{A2}$ and $i_{B2}$ on the output side of the circuit are negative (see polarity designations in FIG. 5), which indicates that current is being fed from the load toward the direction of the supply. Likewise, in FIG. 8a the net currents $i_{A1}$ and $i_{B1}$ on the primary side of the circuit are negative, indicating that power is being returned to the supply.

FIG. 9 shows a more detailed block diagram of a control system for operating the power converter circuit of FIG. 5 including provision for output voltage control by the phase shift method. The phase shift method can also be used to implement the functions of voltage regulation, current regulation, current limiting, and current interruption for an electronic transformer as has been described, and these functions are included in the control system shown in FIG. 9. To provide the basic control circuit for operating the switches in the main power converter circuit 56 in the desired sequence, there is provided a basic oscillator 57 which comprises a high frequency oscillator 58 for supplying clock pulses at twice the desired high frequency switching rate, and the clock pulses in turn toggle a drive flip-flop or bistable multivibrator 59. The output of the drive flip-flop 59 is connected directly to one of two base drive amplifiers 60 comprising the input circuit drive 61 which provides base drive current signals for the base electrodes of the transistor switches in the input switching circuit at the primary side of the high frequency coupling transformer. The output of the high frequency oscillator 58 is also connected to a phase shifter circuit 62 which actuates a second drive flip-flop 63 which is in turn connected directly to an output drive circuit 64 for supplying the base drive signals to the transistor switches in the output switching circuit at the secondary side of the converter circuit. The output drive flip-flop 63 is thus synchronized with the input drive flip-flop 59 but is approximately phase delayed by the phase shifter circuit 62.

In order to provide for the voltage regulation function, a feedback loop is established between the potential transformer 48, which sensess the output voltage of the power converter circuit 56, and an input to the phase shifter 62. The voltage regulation circuit 65 comprises a rectifier and filter circuit 66 for generating a D-C output potential level representative of the average magnitude of the output voltage. This is compared with a preset reference level $V_{reg}$ applied at terminal 67 as a second input to a differential amplifier 68. In this manner, any deviation of the output voltage produces an error or difference signal at the output of the differential amplifier 68 which is supplied to the phase shifter 62 to cause the output transistors to switch conduction states at a slightly different time from the input switches. This phase shift of the output frequency wave with respect to the input high frequency wave operates in such a manner as to change the output voltage.

When the transformer turns ratio of the high frequency coupling transformer 14 is 1:1 and all circuit drops are neglected, then the output low frequency A-C voltage, for example, 60 Hz, will equal the input voltage when is desired to keep the output constant, this technique of is desired to keep the output constant, this techniique of phase shifting produces a proportional reduction in output voltage. As has been explained, a phase shift of 90° between the input and output sides of the high frequency link produces zero low frequency A-C output for any input, with linear control between 0° to 90°. If the transformer turns ratio is altered to 1 to 1.2, then with no phase shift the output will be 20 percent above the input. Shifting the switching times of the output transistors by about 20 percent of 90°, or 18°, causes a reduction in output voltage so that the output voltage is equal to the inpult voltage. Hence, it becomes obvious that the input can now drop 20 percent below the normal and the output can remain constant by appropriately eliminating the relative phase shift between the input and output switching times. In like manner, the input voltage can rise by 20 percent or more and the output can be maintained constant by increasing the phase shift. Thus, regulated output voltage can be obtained for positive or negative variations of the input voltage about its nominal value.

To provide for the functions of current regulation, current limiting, and current interruption, a current feedback loop is established between the current transformer 49, which senses the output current of the power circuit 56, and the phase shifter circuit 62. The current limit and interrupt circuits 69 comprise a rectifier 70 for deriving a D-C signal representative of the output current magnitude which is supplied to a current limit and interrupt circuit 71 having as a second input a current magnitude reference signal $I_{lim}$ applied to a terminal 72. One output signal of the current limit and interrupt circuit 71 is connected to the phase shifter 62, and detection of an overcurrent operates the limit circuit. When the instantaneous current rises above the reference value, a signal proportional to the overcurrent causes the output voltage of the power converter circuit 56 to be reduced by producing a relative phase shift between the periods of conduction of the solid state switches on the input and output sides of the converter circuit, over-riding the voltage regulator, and thereby preventing any substantial increase in the output current.

Current limiting is one aspect of the broader topic of current regulation, and current regulation is obtained much in the same way as voltage regulation is obtained, by replacing the reference signal $I_{lim}$ by a current magnitude reference signal $I_{reg}$ applied to terminal 72', to which the output current is to be adjusted whenever there is a deviation from the reference.

Current interruption can be implemented in several ways, either in combination with current limiting or alone to provide a circuit-breaker function. The preferred method when circuit interruption is preceded by current limiting utilizes a timing circuit 73 connected to another output of the current limit and interrupt circuit 71. The timing circuit 73 begins to measure time when a difference or overcurrent signal is generated in the current limit and interrupt circuit 71 indicating that the reference signal $I_{lim}$ has been exceeded. After a predetermined time delay, as for example 20 power supply cycles, an output signal indicating that the predetermined time interval has elapsed is fed to a base signal modifying circuit 74. The base signal modifying circuit 74 is connected directly to the input circuit drive 61 and the output circuit drive 64, to cut off the base signal drives to all of the transistors in both the primary and secondary sides of the high frequency transformer, or to only the transistors on the primary side, to thereby render nonconductive all or only selected ones of the transistor switches. As will presently become more clear, the base signal modifying circuit 74 may also in one mode of operation actuate the output circuit drive 64 to apply base signals to the output side transistors, turning them on. Preferably all the transistor switches are rendered nonconductive at the first load current zero following the end of the time delay provided by timing circuit 73, to minimize the problem of reactive load current. For this purpose, a zero output current signal $I_0$ derived from the current transformer 49 is supplied to an input terminal 75 of the base signal modifying circuit 74. Upon the coincidence of both the $I_0$ signal and a signal from the timing circuit 73, the base signal modifying circuit 74 produces an output which suppresses the base drive signals and results in turning off the transistors in both the input and output switching circuits of the power converter circuit 56. In the event that the current drops below the level $I_{lim}$ before the preset delay of the timing circuit 73 has elapsed, the timing circuit 73 is reset.

Another method (not here illustrated) of interrupting the power circuit after current limiting is to supply a second higher current limit magitude signal $I_{interrupt}$ to the current limit and interrupt circiut 71, as by applying it to terminal 72' in place of $I_{reg}$. When the normal current limiting action does not adequately limit the current and it rises beyond this second higher reference, then after a suitable time delay the phase shift circuit 62 is actuated to give a full 90° phase shift and cause the output voltage to drop to zero. After another time delay to allow reactive current to decay, the base signal modifying circuit 74 removes the base drive signals to all the transistor switches, turning them off.

To implement a circuit-breaker function wherein current interruption takes place at a selected time without regard to the converter circuit output voltage and current, it is desirable to turn off all of the solid state switches on the input side, thereby opening the connection to the supply, and at the same time to turn on all of the solid state switches on the output side, so that the voltage between the output terminals is substantially reduced to zero and a path is provided to allow reactive load current to circulate. For this method of circuit interruption, a break-circuit signal or command is fed to another input terminal 76 of the base signal modifying circuit 74 to produce an output in this circuit which causes the input circuit drive 61 to remove base drive signals and actuates the output circuit drive 64 to produce transistor base drive signals for a predetermined time. Alternatively, the circuit-breaker action can be obtained by turning off all of the solid state switches at the first current zero following the break-circuit command. That is, when the $I_0$ and break-circuit signals appear at the base signal modifying circuit 74 in coincidence, this circuit initiates the turning off of the transistor switches in both the input and output switching circuits of the power converter circuit.

The inverter configuration input and output switching circuits at either side of the high frequency transformer link may have circuit configurations other than the center-tapped transformer configuration previously described, and it is further not necessary that the same circuit configuration be used on each side of the transformer. The power converter circuit shown in FIG. 10 uses the gate turn-off silicon controlled rectifier (GTO) as the semiconductor switching device, and the input switching circuit 27' is in the full bridge configuration while the output switching circuit 35' is in the half bridge configuration. The GTO device is similar to an ordinary SCR in that it is rendered conductive by a pulse applied to its gate electrode, however, it is unlike the ordinary SCR in that it is rendered nonconductive by another pulse applied to this same gate electrode. The input switching circuit 27' comprises eight of the GTO's 77 connected as four inverse-parallel bidirectional conducting pairs. The primary winding 14p of the high frequency coupling transformer is connected at one end to a junction point 78 between two sets of the inverse-parallel connected GTO pairs, and at the other end to the junction point 79 between the other two sets of inverse-parallel connected pairs of GTO devices, only one of which is numbered. The half bridge output switching circuit 35' includes four of the GTO's 80 connected as two sets of inverse-parallel connected pairs of GTO devices. The secondary winding 14s of the high frequency coupling transformer is connected at one end to the junction point 81 between these two sets, and at the other end to the junction point 82 between two voltage divider capacitors 83 and 84 connected in series circuit relationship across the output terminals 37 and 38. The output filter capacitor 47 may be omitted from the output circuit, although it is shown here. It is believed that the operation of the converter circuit of FIG. 10 is obvious from the previous discussion, in view of the fact that the operation of the full bridge and half bridge circuit configurations is well known. The control system shown in FIG. 9 can, with appropriate modifications, be used to control the converter circuit of FIG. 10.

In view of the fact that the phase shift method of voltage control for this power converter circuit allows the output voltage magnitude to be controlled from zero to full output, with and without a full 180° phase reversal from the line input, the circuit has utility as a wide range voltage control. This is separate and distinct from its use as an electronic transformer. Instead of a closed loop voltage feedback signal to control the phase shifter circuit and thereby regulate the output voltage, a suitable open loop type control or a different type of closed loop control can be provided, such as a current regulator, for example. When used to drive a motor, a tachometer feedback signal can be supplied to the phase shift circuit, to regulate the speed of the motor.

This converter circuit operating from a D-C supply can also be used as an inverter by modulating the phase shift control circuit to provide a desired output waveform. To obtain a sine wave output voltage, the phase shift is changed between 0° to 180° and then between 180° and 0° according to a sine wave function to result in decreasing the output voltage from its maximum value in one polarity through zero to the maximum value in the other polarity, and subsequently back through zero to the first maximum value. Moreover, when used with a D-C supply, one of the switches in each inverse-parallel connected pair on the input side can be replaced by a feedback diode.

In summary, the new power converter circuits employ a high frequency transformer link and use bidirectional conducting solid state controlled turn-off switches in various inverter circuit configurations to convert a relatively low frequency A-C supply voltage or a D-C supply voltage to a high frequency wave which is transformed and reconstructed at the other side of the transformer. By phase shifting the turn-on of the switches on the output side with respect to those on the input side, output voltage control over a wide range with or without polarity reversal is obtained. The converter circuit therefore has application as a wide range voltage control. When used as an electronic transformer, the phase shift method of voltage control is conveniently and economically employed to implement the functions of voltage regulation, current regulation, current limiting, and current interruption.

While the invention has been particularly shown and described with reference to several preferred embodiments thereof, it will be understood by those skilled in the art that various changes in form and details may be made therein without departing from the spirit and scope of the invention.

What I claim as new and desire to secure by Letters Patent of the United States is:

1. A power converter circuit functioning as an electric potential transformer comprising the combination of
   a high frequency linear transformer having a pair of inductively coupled windings,
   a first inverter switching circuit including at least a pair of alternately conductive solid state switching means each of which is effectively connected in series circuit relationship with at least a portion of one of said transformer windings across a first pair of terminals in which appears an electric potential,
   a second inverter configuration switching circuit including at least a pair of alternately conductive solid state switching means each of which is effectively connected in series circuit relationship with at least a portion of the other transformer winding across a second pair of terminals,
   wherein each of said solid state switching means comprises a controlled turn-off device which is rendered nonconductive by a control electrode signal,
   control means for rendering conductive at least one of said switching means in each of the switching circuits, and for alternately rendering conductive at least one of the other switching means in each of the switching circuits, said control means operating to switch said switching means at a high frequency switching rate which is relatively high compared to the frequency of the electric potential appearing in the first pair of terminals and in a sequence to reconstruct at the second pair of terminals a voltage having the same frequency as the potential appearing in the first pair of terminals, and
   phase shift means coupled to said control means for rendering conductive the switching means in the first and second switching circuits at a selected phase angle one with respect to the other,
   whereby the electric potential appearing in the first pair of terminals is converted to a high frequency wave, transformed, and reformed with the desired voltage control at the second pair of terminals.

2. A circuit as defined in claim 1 further including voltage regulation means comprising
   means for sensing the output voltage across the second pair of terminals, and
   means for actuating said phase shift means in accordance with the magnitude of the sensed output voltage to change the relative phase angle at which the switching means in the first and second switching circuits are rendered conductive, to thereby maintain the effective value of the output voltage substantially constant.

3. A circuit as defined in claim 1 further including filter means which comprises a filter capacitor connected across the first pair of terminals, and also includes
   a second filter capacitor connected across the second pair of terminals and a filter inductor connected in series circuit relationship with each of the solid state switching means in the second switching circuit, said second filter capacitor and filter inductor having in combination a relatively high series impedance and low shunt impedance at a frequency equal to twice the high frequency switching rate.

4. A power converter circuit comprising the combination of
   a high frequency linear transformer having a pair of inductively coupled windings,
   a first inverter switching circuit including at least a pair of alternately conductive solid state switching means each of which is effectively connected in series circuit relationship with at least a portion of one of said transformer windings across a first pair of terminals in which appears an electric potential,
   a second inverter configuration switching circuit including at least a pair of alternately conductive solid state switching means each of which is effectively connected in series circuit relationship with at least a portion of the other transformer winding across a second pair of terminals,
   wherein each of said solid state switching means comprises a controlled turn-off device which is rendered nonconductive by a control electrode signal,
   control means for rendering conductive at least one of said switching means in each of the switching circuits, and for alternately rendering conductive at least one of the other switching means in each of the switching circuits at a high frequency switching rate which is relatively high compared to the frequency of the electric potential appearing in the first pair of terminals, and
   phase shift means coupled to said control means for rendering conductive the switching means in the first and second switching circuits at a selected phase angle one with respect to the other,
   whereby the electric potential appearing in the first pair of terminals is converted to a high frequency wave and reformed with the desired voltage control at the second pair of terminals,
   further including current limiting and current interruption means comprising
   means for sensing an overcurrent in said second switching circuit,
   means for actuating said phase shift means in accordance with the magnitude of the overcurrent to change the relative phase angle at which the switching means in the first and second switching circuits are rendered conductive, to thereby change the output voltage across the second pair of terminals and consequently present any further substantial increase in the current, and
   means operative after a predetermined time interval of overcurrent for modifying the action of said control means to result in rendering nonconductive selected ones of said switching means.

5. A power converter circuit comprising the combination of
   a high frequency linear transformer having a pair of inductively coupled windings,
   a first inverter switching circuit including at least a pair of alternately conductive solid state switching means each of which is effectively connected in series circuit relationship with at least a portion of one of said transformer windings across a first pair of terminals in which appears an electric potential,
   a second inverter configuration switching circuit including at least a pair of alternately conductive solid state switching means each of which is effectively connected in series circuit relationship with at least a portion of the other transformer winding across a second pair of terminals,
   wherein each of said solid state switching means comprises a controlled turn-off device which is rendered nonconductive by a control electrode signal,
   control means for rendering conductive at least one of said switching means in each of the switching circuits, and for alternately rendering conductive at least one of the other switching means in each of the switching circuits at a high frequency switching rate which is relatively high compared to the frequency of the electric potential appearing in the first pair of terminals, and phase shift means coupled to said control means for rendering conductive the switching means in the first and second switching circuits at a selected phase angle one with respect to the other, whereby the electric potential appearing in the first pair of terminals is converted to a high frequency wave and reformed with the desired voltage control at the second pair of terminals, further including current interruption means comprising means for receiving an input break-circuit command to break the effective electrical connection between the two pairs of terminals, and means for modifying the operation of said control means to result in rendering nonconductive all of the controlled turn-off devices in said first switching circuit and for simultneously rendering conductive all of the controlled turn-off devices in said second switching circuit, whereby the current is interrupted and the voltage between said second pair of terminals is reduced to zero and a conductive path is provided between said second pair of terminals for remaining current to decay.

6. A power converter circuit comprising the combination of a high frequency linear transformer having a pair of inductively coupled windings, a first inverter switching circuit including at least a pair of alternately conductive solid state switching means each of which is effectively connected in series circuit relationship with at least a portion of one of said transformer windings across a first pair of terminals in which appears an electric potential, a second inverter configuration switching circuit including at least a pair of alternately conductive solid state switching means each of which is effectively connected in series circuit relationship with at least a portion of the other transformer winding across a second pair of terminals, wherein each of said solid state switching means comprises a controlled turn-off device which is rendered nonconductive by a control electrode signal, control means for rendering conductive at least one of said switching means in each of the switching circuits, and for alternately rendering conductive at least one of the other switching means in each of the switching circuits at a high frequency switching rate which is relatively high compared to the frequency of the electric potential appearing in the first pair of terminals, and phase shift means coupled to said control means for rendering conductive the switching means in the first and second switching circuits at a selected phase angle one with respect to the other, whereby the electric potential appearing in the first pair of terminals is converted to a high frequency wave and reformed with the desired voltage control at the second pair of terminals, further including current interruption means comprising means for sensing when the current in said second switching circuit is substantially zero, means for receiving an input break-circuit command to break the effective electrical connection between the two pairs of terminals, and means operative at the first current zero-sensed after receiving said break-circuit command for suppressing said control circuit to result in rendering nonconductive all of said controlled turn-off devices, to thereby interrupt the current.

7. A power converter circuit useful as an electric potential transformer for both direct current and alternating current potentials comprising the combination of a high frequency linear transformer having inductively coupled primary and secondary windings, a first inverter switching circuit including a pair of alternately conductive solid state switching means each of which is effectively connected in series circuit relationship with at least a portion of the primary transformer winding across a first pair of terminals in which appears an electric potential, a second inverter configuration switching circuit including a pair of alternately conductive solid state switching means each of which is effectively connected in series circuit relationship with at least a portion of the secondary transformer winding across a second pair of terminals, wherein each of said solid state switching means comprises a pair of inverse parallel connected controlled turn-off devices each of which is rendered nonconductive by a control electrode signal, capacitive filter means connected across the first pair of terminals and inductive filter means connected in series circuit relationship with the second switching circuit, control means for rendering conductive one of the switching means in each of the switching circuits for desired intervals of conduction, and for alternately rendering conductive the other switching means in each of the switching circuits for equal intervals of conduction, said control means operating to switch said switching means at a substantially constant high frequency switching rate which is relatively high compared to the frequency of the electric potential appearing in the first pair of terminals and in a sequence to reconstruct at the second pair of terminals a voltage having the same frequency as the potential appearing in the first pair of terminals, and phase shift means coupled to said control means for rendering conductive the switching means in the first and second switching circuits at a selected phase angle, one with respect to the other, in the range of 0° to 180°, whereby the direct current or low frequency alternating current potential appearing in the first pair of terminals is converted to a high frequency wave, transformed, and reformed with the desired voltage control at the second pair of terminals.

8. A circuit as defined in claim 7 further including voltage regulation means comprising means for sensing the output voltage across the second pair of terminals, means for comparing the sensed output voltage with a reference and for deriving a signal representative of the difference, and means for actuating said phase shift means in accordance with the magnitude of the difference signal to change the relative phase angle at which the switching means in the first and second switching circuits are rendered conductive, to thereby maintain the effective output voltage substantially constant.

9. A circuit as defined in claim 7 further including current regulation means comprising means for sensing the current in said second switching circuit, means for comparing the sensed current with a reference current and for deriving a signal representative of the current difference, and means for actuating said phase shift means in accordance with the current difference signal to change the relative phase angle at which the switching means in the first and second switching circuits are rendered conductive, to thereby control the output voltage across the second pair of terminals and consequently regulate the current to substantially equal the reference current.

10. A circuit as defined in claim 7 further including current limiting means comprising
   means for sensing the current in said second switching circuit,
   means for comparing the sensed current with a reference current and for deriving a signal representative of the overcurrent difference, and
   means for actuating said phase shift means in accordance with the overcurrent difference signal to change the relative phase angle at which the switching means in the first and second switching circuits are rendered conductive in a direction toward 90°, to thereby change the output voltage across the second pair of terminals and consequently limit the current.

11. A circuit as defined in claim 7 wherein said controlled turn-off devices are gate turn-off silicon controlled rectifiers, and further including
   current limiting means and output voltage control means each coupled to said phase shift means to change the relative phase angle at which the switching devices in the first and second switching circuits are rendered conductive.

12. A circuit as defined in claim 7 wherein said controlled turn-off devices are transistors, and further including
   current limiting means and output voltage control means each coupled to said phase shift means to change the relative phase angle at which the switching devices in the first and second switching circuits are rendered conductive.

13. A power converter circuit for both direct current and alternating current potentials comprising the combination of
   a high frequency linear transformer having inductively coupled primary and secondary windings,
   a first inverter switching circuit including at least a pair of alternately conducting solid state switching means each of which has bidirectional conducting characteristics and is effectively connected in series circuit relationship with at least a portion of said primary transformer winding across a first pair of terminals in which appears an electric potential,
   a second inverter configuration switching circuit including at least a pair of alternately conductive solid state switching means each of which has bidirectional conducting characteristics and is effectively connected in series circuit relationship with at least a portion of said secondary transformer winding across a second pair of terminals,
   wherein each of said bidirectional conducting solid state switching means comprises controlled turn-off device means having at least one control electrode which is rendered nonconductive by a control electrode signal,
   control means for rendering conductive at least one of said switching means in each of the switching circuits, and for alternately rendering conductive at least one of the other switching means in each of the switching circuits, said control means operating to switch said switching means at a high frequency switching rate which is relatively high compared to the frequency of the potential appearing in the first pair of terminals and in a sequence to reconstruct at the second pair of terminals a voltage having the same frequency as the potential appearing in the first pair of terminals, and
   phase shift means coupled to said control means for rendering conductive the switching means in the first and second switching circuits at a selected phase angle one with respect to the other to control the magnitude of the voltage reconstructed at the second pair of terminals.

14. A power converter circuit used as an electric potential transformer for both direct current and alternating current potentials comprising the combination of
   a high frequency linear transformer having inductively coupled primary and secondary windings,
   a first inverter switching circuit including at least a pair of alternately conductive solid state switching means each of which is effectively connected in series circuit relationship with at least a portion of said primary transformer winding across a first pair of terminals in which appears an electric potential,
   a second inverter configuration switching circuit including at least a pair of alternately conductive solid state switching means each of which is effectively connected in series circuit relationship with at least a portion of the secondary transformer winding across a second pair of terminals,
   wherein each of said solid state switching means in both of said first and second switching circuits has bidirectional conducting characteristics and comprises a controlled turn-off device which is rendered non-conductive by a control electrode signal,
   control means for rendering conductive at least one of said switching means in each of the switching circuits, and for alternately rendering conductive at least one of the other switching means in each of the switching circuits, said control means operating to switch said switching means at a high frequency switching rate which is relatively high compared to the frequency of the electric potential appearing in the first pair of terminals and in sequence to reconstruct at the second pair of terminals a voltage having the same frequency as the potential appearing in the first pair of terminals,
   phase shift means coupled to said control means for rendering conductive the switching means in the first and second switching circuits at a selected phase angle one with respect to the other, and
   means for controlling said phase shift means in response to the current in said second switching circuit and the voltage across said second pair of terminals.

References Cited

UNITED STATES PATENTS

| | | | |
|---|---|---|---|
| 2,907,944 | 10/1959 | Hume | 321—69 |
| 3,027,522 | 3/1962 | Boxall et al. | 330—10 XR |
| 3,205,424 | 9/1965 | Bates. | |
| 3,246,231 | 4/1966 | Clarke | 321—60 |
| 3,319,147 | 5/1967 | Mapham | 321—60 XR |
| 3,376,492 | 4/1968 | Morgan et al. | 321—43 |

WILLIAM M. SHOOP, JR., Primary Examiner

U.S. Cl. X.R.

321—61, 65, 68, 69